US007315381B2

(12) United States Patent
Sesko et al.

(10) Patent No.: US 7,315,381 B2
(45) Date of Patent: Jan. 1, 2008

(54) MONOLITHIC QUADRATURE DETECTOR

(75) Inventors: David W. Sesko, Woodinville, WA (US); Mark Feldman, Redmond, WA (US)

(73) Assignee: Mitutoyo Corporation, Kawasaki (JP)

( * ) Notice: Subject to any disclaimer, the term of this patent is extended or adjusted under 35 U.S.C. 154(b) by 286 days.

(21) Appl. No.: 10/972,403

(22) Filed: Oct. 26, 2004

(65) Prior Publication Data

US 2006/0087658 A1    Apr. 27, 2006

(51) Int. Cl.
*G01B 9/02* (2006.01)
(52) U.S. Cl. ............ 356/493; 356/495; 356/498; 356/511
(58) Field of Classification Search ........ 356/491–495, 356/498, 511
See application file for complete search history.

(56) References Cited

U.S. PATENT DOCUMENTS

| 5,949,546 | A | 9/1999 | Lee et al. | |
|---|---|---|---|---|
| 6,201,609 | B1 | 3/2001 | Hill et al. | |
| 6,741,357 | B2* | 5/2004 | Wang et al. | 356/493 |
| 2002/0135779 | A1 | 9/2002 | Qian et al. | |
| 2003/0160968 | A1 | 8/2003 | Deck | |
| 2005/0195404 | A1* | 9/2005 | Carlson | 356/493 |
| 2006/0146340 | A1* | 7/2006 | Szwaykowski et al. | 356/495 |

FOREIGN PATENT DOCUMENTS

EP    0 313 681    5/1989

WO    WO 2004/007269 A1    8/2004

OTHER PUBLICATIONS

R.M.A. Azzam, "Thin-film beam splitter that reflects light as a half-wave retarder and transmits it without change of polarization: application to a Michelson interferometer," J. Opt. Soc. Am. A, 3, 1803-1808 (1986).
H. Fabricius, "Achromatic prism retarder for use in polarimetric sensors," Appl. Opt. 30, 426-429 (1991).
E. Nelan et al., "Fine Guidance Sensor Instrument Handbook," Version 12.0, Baltimore: Space Telescope Science Institute (2003) pp. 11-16.
W. H. Southwell, "Multilayer coating design achieving a broadband 90° phase shift," Appl. Opt. 19, 2688-2692 (1980).

* cited by examiner

*Primary Examiner*—Hwa (Andrew) Lee
(74) *Attorney, Agent, or Firm*—Oliff & Berridge, PLC (57) ABSTRACT

A compact monolithic quadrature detector generates four signals from an input beam including orthogonally polarized object and reference beam components provided by an interferometer. The single input beam may be split into four output beams using a first beam splitting interface between two prisms, reflections at two air interface surfaces of the prisms, and a second beam splitting element. Different respective predetermined phase shifts may be imposed on the respective output beams by coatings on the beam splitting surfaces, which impart a different phase shift to the components of a transmitted beam as compared to a reflected beam. The four relatively phase shifted output beams may be directed through polarizers onto respective detectors to provide four signals usable to eliminate many common mode errors and determine the phase difference between the components of the original input beam with high accuracy.

15 Claims, 7 Drawing Sheets

MONOLITHIC QUADRATURE DETECTOR

BACKGROUND OF THE INVENTION

1. Field of Invention

This invention is directed to detectors for interferometric distance measuring and surface profiling devices.

2. Description of Related Art

Laser interferometers are widely used to measure a distance to a sample surface and to measure a surface profile. Laser interferometers operate by splitting a source of coherent radiation into two beams, an object beam and a reference beam, using, for example, a beam splitter. The reference beam is directed to a reference mirror which is located at a fixed distance from the beam splitter. The object beam is directed to a sample surface which is located at some other distance from the beam splitter. The object beam is reflected from the sample surface, and is recombined with the reference beam at the beam splitter. The object beam and reference beam can be made to constructively or destructively interfere, depending on the relative phase of the object beam compared to the reference beam. A detector measures the intensity of the interference light, which is related to the phase difference between the object beam and the reference beam, which is, in turn, related to the difference between the object path length from the beam splitter to the sample surface and the reference path length from the beam splitter to the reference mirror.

SUMMARY

The resolution and/or accuracy of a laser interferometer are limited by the ability of the phase difference detectors, also referred to simply as detectors herein, to generate a signal which is truly related to the phase difference between the object beam and the reference beam. In various interferometer designs, the object beam and the reference beam are orthogonally polarized, and then combined using a polarizer to provide an interfering beam having an intensity indicative of the phase shift between the beams. When measuring phase differences based on the intensity of such interfering object and reference beams, certain phase difference ambiguities and various potential phase difference measurement errors may be eliminated by providing a plurality of respective signals from respective interfering beams into which known, intentionally introduced, phase differences have been added prior to their combination at the polarizer, and processing the plurality of respective interfering beam signals to remove common mode errors, and determine and compensate certain other errors, and the like. Discrete detectors may be used to generate such a plurality of signals from separate interfering beams that arise from separate beams paths that use discrete optics that manipulate each beam individually. However, while capable of eliminating some errors, such approaches are still prone to residual systematic errors such as those due to variations and instabilities in the gain coefficient for each detector, variations and instabilities in the intensity of each beam before reaching the detector, and variations and instabilities in the path lengths of each of the separate beams as transmitted by the discrete optics.

Compact, monolithic polarization-type quadrature detectors are described which may produce a more accurate measurement of the phase difference between orthogonally polarized object path and reference path beams in an interferometer. The compact detector produces a plurality of respective interference signals from a pair of orthogonally polarized object and reference input beams. In one design configuration the plurality of respective interference signals comprises four outputs that are phase shifted by known amounts relative to one another. In various design configurations the respective interference signals are provided by mixing the respective phase shifted object and reference beam pairs using polarizers at each of the respective outputs, to provide an interference signal having an intensity indicative of the phase difference between the object beam and reference beam at each respective output.

The compact quadrature detector may have a first pair of prisms adjacent to each other and to a beam splitting element. The first pair of prisms may split an input beam containing orthogonally polarized object and reference beam components into two beams at a first beam splitter surface or interface between the two prisms. The two beams may be reflected by total internal reflection at respective air-prism interfaces of the first pair of prisms, and then directed to the beam splitting element. The respective air-prism interfaces of the first pair of prisms may be symmetrically located relative to the first beam splitter interface. The beam splitting element may split the two beams into four output beams, at a second beam splitter surface or interface.

Each of the four output beams, therefore, is derived from a single common or shared beam, and is split from the common or shared beam at some point to take an individual path through the remainder of the monolithic quadrature detector. In one design configuration, the first beam is transmitted at the first beam splitter interface and transmitted at the second beam splitter interface, and traverses a first polarizer before impinging on a first detector. The second beam is reflected at the first beam splitter interface, transmitted at the second beam splitter interface, and traverses the first polarizer before impinging on a second detector. The third beam is reflected at the first beam splitter interface, reflected at the second beam splitter interface, and traverses a second polarizer before impinging on a third detector. The fourth beam is transmitted at the first beam splitter interface, is reflected at the second beam splitter interface, and traverses the second polarizer before impinging on a fourth detector.

In one design configuration, at least one of the four respective output beams traverses a respective retarder element, for example a quarter-wave plate or half-wave plate, or the like, that imparts a controlled and predetermined amount of relative phase shift between the orthogonally polarized components of the respective output beam. Of course, it will be understood that the controlled or predetermined amount of relative phase shift provided by a practical component in a particular design will actually be defined as some relative phase shift that is within reasonable fabrication and/or calibration tolerances relative to a controlled or predetermined nominal relative phase shift. Some of the respective output beams may traverse a respective beam path element that adds a nominal optical path length to match the nominal optical path length added by the retarder element(s).

In general, each of the first and second beam splitter interfaces may impart a different phase shift on the two orthogonally polarized components of the beam, the S and the P components, defined below, depending on whether the beam is reflected or transmitted. Therefore, each of the first, second, third and fourth beams may arrive at the respective polarizers and detectors with a different relative phase shift between their orthogonal components, wherein each relative phase shift may include a component contributed at the first and/or second beam splitter interface. In one design configuration, the first and/or second beam splitter interface may be fabricated to impart a specifically determined phase shift between the two orthogonally polarized components of the beam, the S and the P components, depending on whether the beam is reflected or transmitted. Thus, in such a design configuration, the first and/or second beam splitter interface may provide one or more of the previously described retarder elements, as well as providing a beam splitting function.

Regardless of the method of imparting a controlled and predetermined amount of relative phase shift between the orthogonally polarized components of each respective output beam, the respective polarizer mixes the orthogonally polarized components so that each detector generates an interference signal that is responsive to the phase difference between its associated orthogonally polarized output beam components.

By appropriate manipulations of the values of the signals output by the first, second, third and fourth detectors, which may include, for example, appropriate subtraction and division operations as described further below, various potential error contributions can be eliminated or compensated to a high degree. Thus, the phase difference between the input object beam and the reference beam can be determined with a very high level of accuracy and resolution using a detector that provides an unprecedented level of stability and compact size. The various potential error contributions that can be eliminated include, but are not limited to various DC offsets in the detectors, fluctuations in the laser intensity, as well as other error sources outlined above. Thus, a compact quadrature detector according to this invention may be used to provide compact and high accuracy interferometric distance measuring and surface profiling devices, and the like.

These and other features and advantages are described in, or are apparent from, the following detailed description.

BRIEF DESCRIPTION OF THE DRAWINGS

Various details are described below with reference to the following figures, wherein.

DETAILED DESCRIPTION

Figure 1:
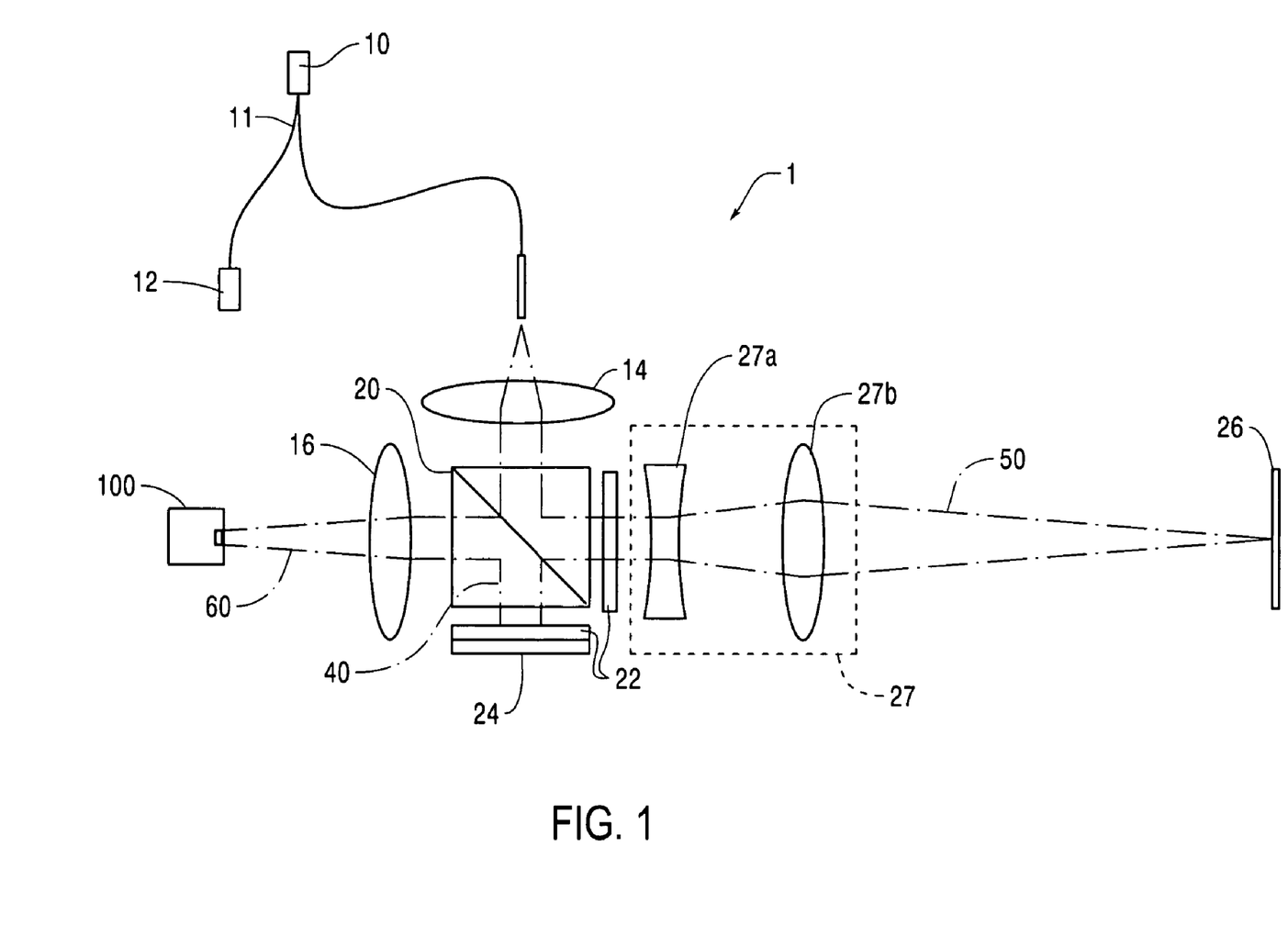
FIG. 1 illustrates a laser interferometer apparatus.

FIG. 1 shows an exemplary laser interferometer apparatus 1 which may employ a compact monolithic quadrature detector. A laser source 10 may be used to generate coherent light, which is input to an optical fiber 11. Optical fiber 11 delivers the light to a collimating lens 14, which collimates the light output from optical fiber 11, and to an optional wavelength measuring device 12, which measures the wavelength of the light, if needed to insure sufficient distance or displacement measuring accuracy. The light from collimating lens 14 is incident on a polarizing beam splitter 20, which transmits the portion of the light which is "P" polarized (for which the electric field vector is in the plane of the paper), and reflects the portion of the light which is "S" polarized (for which the electric field vector is perpendicular to the paper). The P polarized portion of the light transmitted through polarizing beam splitter 20 becomes the reference beam 40. Reference beam 40 is incident on a quarter wave plate 22, which produces circular polarization. Reference beam 40 is then incident on a reference mirror 24, which reflects the light back to polarizing beam splitter 20. By virtue of the 180° phase shift upon reflection and a second pass through the quarter wave plate 22, the direction of polarization of the reference beam 40 is now rotated 90° relative to the input reference beam. The beam is now S polarized (electric field vector perpendicular to the plane of the paper) so that the returned reference beam 40 is reflected by the polarizing beam splitter 20 to form one orthogonally polarized component of a detector input beam 60.

The S polarized portion of the incident light beam reflected by polarizing beam splitter 20 becomes object beam 50. Object beam 50 is incident on another quarter wave plate 23, which produces circular polarization. Object beam 50 is then focused onto a surface of a sample 26 by a focusing arrangement 27, which may include a diverging lens 27a and a focusing lens 27b. Object beam 50 is reflected from a surface of sample 26, and then is directed back through the quarter wave plate and polarizing beam splitter 20. By virtue of the phase shift upon reflection and the second pass through quarter wave plate 22, the direction of polarization of the returned object beam 50 is now rotated 90° relative to the input object beam and forms the other orthogonally polarized component of the detector input beam 60. By analyzing the re-combined beam with a polarizer and measuring the intensity of the interfering components of the detector input beam 60, a detector arrangement 100 provides signals usable to determine the phase difference between object beam 50 and reference beam 40. The phase difference between object beam 50 and reference beam 40 is indicative of the optical path length difference between the object and reference beams, and a change in the distance to the surface of the sample 26 can be measured based on the wavelength of the light and the associated change in the phase difference between the object beam 50 and reference beam 40.

It should be appreciated that although the configuration shown in FIG. 1 is primarily useful to sense the displacement of a sample surface at a single point on the surface, the configuration could include an arrangement that scans the focused point of the object beam 50 over the surface of the sample 26 in order to provide a profile of the surface. Furthermore, with a suitable focusing arrangement 27 and a "linear" quadrature detector arrangement 100 that includes a suitable 1D or 2D photodetector array, a configuration similar to that shown in FIG. 1 can project an object beam onto a linear strip of the surface of the sample 26, and detect the difference in the distance to the surface at various points along the linear strip using the linear quadrature detector arrangement 100. Furthermore, the object beam can be scanned over the surface of the sample 26 to provide 2D profile of the surface. Alternatively, if a collimating arrangement is used in place of the focusing arrangement 27 and a "2D" quadrature detector arrangement 100 includes a suitable 2D photodetector array, a configuration similar to that shown in FIG. 1 can project an object beam onto a 2-D patch of the surface of the sample 26, and detect the difference in the distance to the surface at various points within the patch using the 2D detector arrangement 100, to provide a 2D profile of the surface. The various compact monolithic quadrature detector configurations disclosed herein can be used in any of the variations described above, provided that the photodetectors used in the various configurations include the appropriate configuration and/or array of photodetector elements, as will be understood by one skilled in the art having the benefit of this disclosure.

Figure 2:
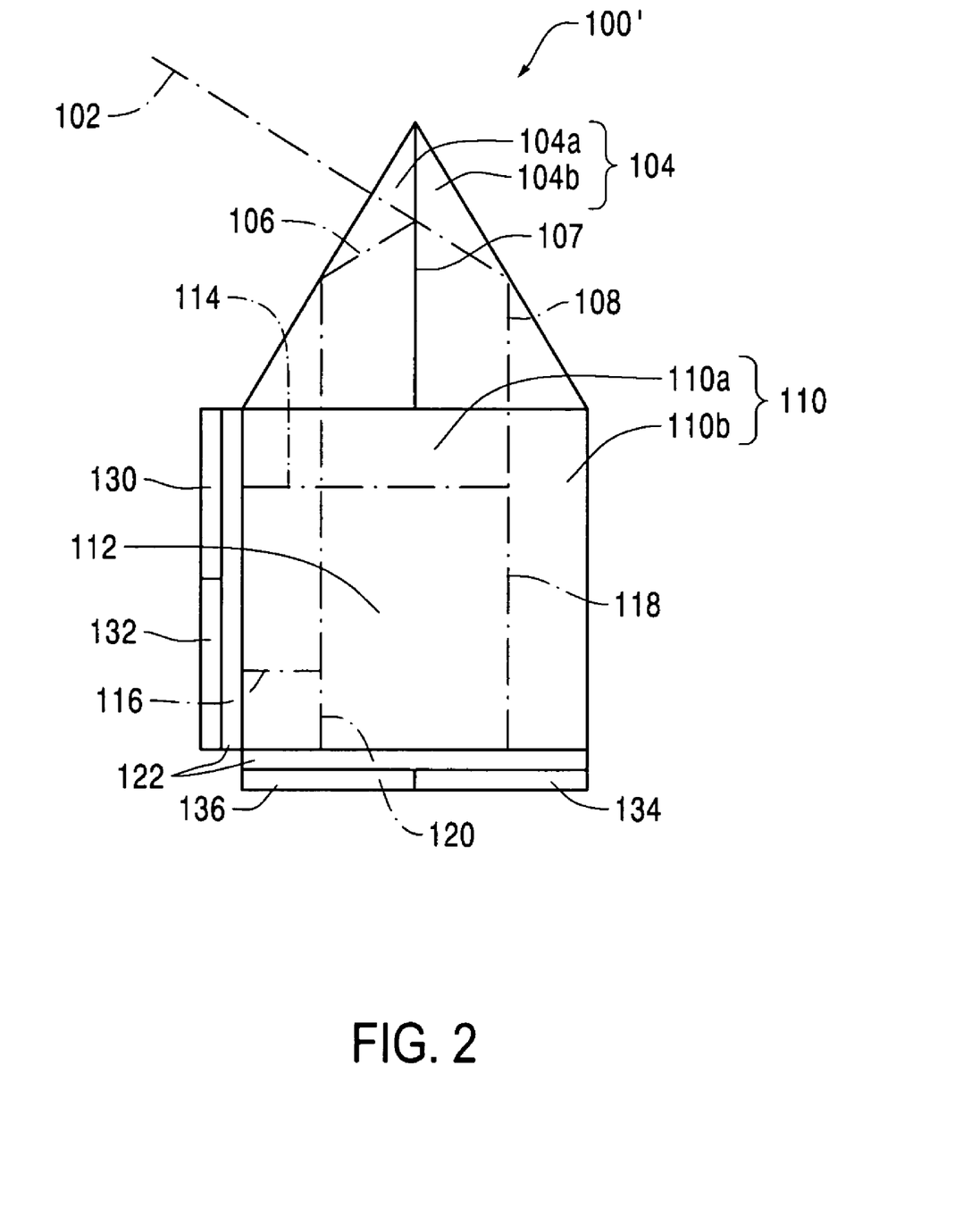
FIG. 2 illustrates an exemplary compact monolithic quadrature detector.

Quadrature detector arrangement 100 shown in FIG. 1 may be of any of the designs shown in greater detail in FIGS. 2-6, or as otherwise taught herein. The compact monolithic quadrature detector 100' shown in FIG. 2 generates four signals: an in-phase signal A; an in-phase quadrature signal C; an out-of-phase signal B; and an out-of-phase quadrature signal D, each measured by a respective detector, for example. Each of these signals is related to the phase Φ of object beam 50 relative to reference beam 40, according to:

$$A = V_A \sin \Phi + DC_A \quad (1)$$

$$B = V_B \sin(\Phi + 180) + DC_B \quad (2)$$

$$C = V_C \sin(\Phi + 90) + DC_C \quad (3)$$

$$D = V_D \sin(\Phi + 270) + DC_D \quad (4)$$

where $V_A$, $V_B$, $V_C$, $V_D$ are the signal amplitudes of A, B, C and D, and $DC_A$, $DC_B$, $DC_C$ and $DC_D$ are the DC offsets of A, B, C, and D. Assuming the detectors have been previously calibrated, $DC_A = DC_B$, and $DC_C = DC_D$. In addition, since the laser intensity is approximately constant over the measurement period, either $V_A = V_B = V_C = V_D$ or else the signals can be corrected for systematic differences in $V_A$, $V_B$, $V_C$, $V_D$. For example, variability in the transmission and reflection coefficients of the beam splitting surfaces can give rise to variations in $V_A$, $V_B$, $V_C$, $V_D$, which can be measured and corrected for. Lastly, since $\sin(\Phi+90)=\cos \Phi$, and $\sin(\Phi+180)=-\sin \Phi$, the signals can be combined to determine the phase difference Φ, according to the following equation:

$$\Phi = \tan^{-1}\left(\frac{A-B}{C-D}\right) \quad (5)$$

to generate a measurement of a phase difference Φ between the two arms of interferometer 1.

A feature of quadrature detector arrangement 100' is that each signal A, B, C and D is taken from the detector input beam as a whole. This means that any changes in a beam intensity profile of the input beam will affect each measurement of A, B, C and D equally, which eliminates offset errors that would arise in the absence of this feature. According to Eq. (5), by taking the differential signals A–B and C–D, most of the common mode DC offset errors $DC_A$, $DC_B$, $DC_C$, $DC_D$ may be reduced or even eliminated. Furthermore, taking the ratio (A–B)/(C–D) may also reduce or eliminate effects due to variations in the amplitude $V_A$, $V_B$, $V_C$ and $V_D$ of the signals, such as produced by changes in the laser intensity. Finally, as discussed further below, orthogonality errors (phase errors) may also be compensated for, or calibrated away.

Alternatively to the arctangent function shown in Eq. (5) above, taking A–B=arg1 and C–D=arg2, the four-quadrant inverse tangent function atan2(arg1, arg2), which is commonly found in commercially available mathematical software, may be used. The atan2 function has the advantage of determining the quadrant of the resulting angle based on the signs of the two arguments, so that a value between −π and +π, rather than between −π/2 and +π/2, is returned. This eliminates the need for special operations to resolve the potential ambiguity inherent in Eq. (5).

Quadrature detector arrangement 100' may provide a unique beam splitting arrangement which results in the four measured signals. As shown in FIG. 2, at the top of quadrature detector arrangement 100' are two 30-90-60 prisms 104a and 104b which constitute a first beam splitter 104. The two 30-90-60 prisms may be disposed on a beam splitting element, which in the configuration shown in FIG. 2 is a 50/50 non-polarizing beam splitting cube 110, which includes two 45-90-45 prisms 110a and 110b. The two 30-90-60 prisms 104a and 104b split input beam 102 into two beams 106 and 108, at interface 107 between the two prisms, as shown in FIG. 2.

The 30-90-60 degree prisms 104a and 104b may be arranged so that that a 30 degree angle of one prism is located adjacent to the corresponding 30 degree angle of the other prism, and a 90 degree angle of the one prism is located adjacent to the corresponding 90 degree angle of the other prism. When light is incident on the interface between the prisms 104a and 104b at a 30 degree angle of incidence, the interface splits the beam in a 50/50 ratio, with one sub-beam reflected and the other sub-beam transmitted through the interface 107. The input beam 102, incident normal to entrant surface 103, is therefore incident on the interface with a 30 degree angle of incidence, and is therefore split 50/50 into beams 106 and 108.

Beam 106, which is reflected at interface 107 between the two 30-90-60 prisms 104a and 104b, is then incident on the air-prism interface by an angle which exceeds the critical angle for that interface, which may be on the order of 41.8° for a prism having an index of refraction of 1.5, for example. Therefore, beam 106 is reflected by total internal reflection and is directed into beam splitting cube 110. Similarly, beam 108, which was transmitted at the interface 107 between the 30-90-60 prisms 104a and 104b, is also incident on the air-prism interface with an angle exceeding the critical angle. Therefore, beam 108 is also reflected by total internal reflection, and is directed into beam splitting cube 110.

The total internal reflection of beams 106 and 108 at the glass-air interface imparts a relative phase shift $\Delta^{(TIR)}$ between the P and S components in each of the beams 106 and 108 given by:

$$\Delta^{(TIR)} = \delta_P - \delta_S = -2\arctan\left[\frac{\cos\theta\sqrt{\sin^2\theta - \left(\frac{n_A}{n_G}\right)^2}}{\sin^2\theta}\right] \quad (6)$$

where $\delta_P$ and $\delta_S$ are the phase shifts of the P and S components of light beam 102, respectively, θ is the angle of incidence, $n_A$ is the refractive index of air, and $n_G$ is the refractive index of the prism glass. Although the S and P components of light beam 102 are shifted relative to each other, the phase shift is constant so long as the angle of incidence and the refractive indices do not change, so that the phase shift only enters Eqs. (1)-(4) as a phase offset contribution, and therefore contributes a fixed offset to calculation of the phase difference Φ given by Eq. (5), which has the same effect as an initial or inherent path length difference between the object and reference path lengths and is essentially inconsequential when determining a displacements or profile of the surface of the sample 26, and for many other typical uses of interferometers such as those described herein.

Beam splitting cube 110 may then split beams 106 and 108 into four output beams, as shown in FIG. 2, at surface 112 of beam splitting cube 110. Two output beams 114 and 116 may be reflected at beam splitter surface 112, and two output beams 118 and 120 may be transmitted by surface 112. Beams 114 and 118 are then detected by detectors 130 and 132, and beams 118 and 120 are detected by detectors 134 and 136. Detectors 130 and 132 may be two individual detectors, or detectors 130 and 132 may be two halves of the same detector, for example, one half of a charge-coupled device (CCD) detector array area. Similarly, detectors 134 and 136 may be two individual detectors, or detectors 134 and 136 may be two halves of the same detector.

Using the prism arrangement of FIG. 2, beam splitting interface 107 in first beam splitter 104, and beam splitting interface 112 in second beam splitting cube 110, may be coated, for example with a multilayer thin film, to impart different phase shifts between the S and P polarizations of the reflected beam relative to the transmitted beam. For example, beam splitting surface 107 may be coated to impart a 0 degree phase shift on transmitted beam 108, and a 180 degree phase shift on reflected beam 106. Therefore, $$\Delta_{T1} = \delta_P^{(T1)} - \delta_S^{(T1)} = 0 \quad (7)$$

$$\Delta_{R1} = \delta_P^{(R1)} - \delta_S^{(R1)} = 180 \quad (8)$$

where $\delta_S^{(T1)}$, $\delta_S^{(R1)}$ are the phase shifts of the transmitted and reflected S polarization components, respectively, at beam splitting surface 107; $\delta_P^{(T1)}$, $\delta_P^{(R1)}$ are the phase shifts of the transmitted and reflected P polarization components, respectively, at beam splitting surface 107; and $\Delta_{T1}$ and $\Delta_{R1}$ are the difference between the phase shifts of the S and P polarization components of the transmitted wave and reflected wave, respectively, at beam splitting surface 107. Beam splitting interface 112 may then be coated to impart a 90 degree phase shift on reflected beams 114 and 116, and 0 degree phase shift on transmitted beams 118 and 120.

$$\Delta_{T2} = \delta_P^{(T2)} - \delta_S^{(T2)} = 0 \quad (9)$$

$$\Delta_{R2} = \delta_P^{(R2)} - \delta_S^{(R2)} = 90 \quad (10)$$

where $\Delta_{T2}$ and $\Delta_{R2}$ are the difference between the phase shifts of the P and S polarizations of the transmitted wave and reflected wave at beam splitting surface 112, respectively.

In this implementation, beam 118 will generate signal A, according to Eq. (1), because beam 118 accumulated 0 degrees of phase shift by being transmitted at beam splitting interface 107, and 0 degrees of phase shift by being transmitted also at beam splitting interface 112. Beam 120 will generate signal B, according to Eq. (2), because beam 120 accumulated 180 degrees of phase shift by being reflected at beam splitting interface 107, and 0 degrees of phase shift by being transmitted at beam splitting interface 112. Beam 114 will generate signal C, according to Eq. (3), because beam 114 accumulated 0 degrees of phase shift by being transmitted at beam splitting interface 107, and 90 degrees of phase shift by being reflected at beam splitting interface 112. Beam 116 will generate signal D according to Eq. (4), because beam 116 accumulated 180 degrees of phase shift by being reflected at beam splitting interface 107, and 90 degrees of phase shift by being reflected at beam splitting interface 112.

A pair of polarizers 122 may define the direction of polarization in which the mixing and interference of beams 114, 116, 118 and 120 takes place. Preferably, the transmission axes of polarizers 122 are oriented consistently with respect to the S and P polarization directions, as defined by looking in the direction of the oncoming beam. Ideally, the transmission axis of polarizers 122 is oriented at 45 degrees or −45 degrees with respect to the S and the P axes.

Polarizers 122 maybe disposed directly upstream of detectors 130, 132, 134 and 136. Therefore, signal A will be output by detector 134, signal B will be output by detector 136, signal C will be output by detector 130, and signal D will be output by detector 132. Signals A, B, C and D may be combined according to Eq. (5) to yield the phase difference between the S and P polarizations, which is indicative of the difference in path length (modulo the wavelength of the light used), between arms 40 and 50 of interferometer 1. A change in the distance to the surface of the sample 26 can be measured based on the wavelength of the light and the associated change in the phase difference (accumulated over a number of phase cycles if necessary) between the arms 40 and 50.

From the above discussion and from an inspection of FIG. 2, it is clear that there are a number of other implementations that may generate the four signals A, B, C and D according to Eqs. (1)-(4). Some of these alternative implementations are listed in Table 1 below.

TABLE 1

| 30° Beamsplitter | | 45° Beamsplitter | | Output Channel Phase Shifts $\Delta^{(i)}$ | | | |
|---|---|---|---|---|---|---|---|
| | | | | $\Delta_{T1} +$ | $\Delta_{T1} +$ | $\Delta_{R1} +$ | $\Delta_{R1} +$ |
| $\Delta_{T1}$ | $\Delta_{R1}$ | $\Delta_{T2}$ | $\Delta_{R2}$ | $\Delta_{T2}$ | $\Delta_{R2}$ | $\Delta_{T2}$ | $\Delta_{R2}$ |
| 0 | 180 | 0 | 90 | 0 | 90 | 180 | 270 |
| | | 90 | 0 | 90 | 0 | 270 | 180 |
| 180 | 0 | 0 | 90 | 180 | 270 | 0 | 90 |
| | | 90 | 0 | 270 | 180 | 90 | 0 |
| 0 | 90 | 0 | 180 | 0 | 180 | 90 | 270 |
| | | 180 | 0 | 180 | 0 | 270 | 90 |
| 90 | 0 | 0 | 180 | 90 | 270 | 0 | 180 |
| | | 180 | 0 | 270 | 90 | 180 | 0 |

The column in Table 1 labeled $\Delta_{T1}+\Delta_{T2}$ corresponds to beam 118, which is transmitted at first interface 107 ($\Delta_{T1}$) and transmitted at second interface 112 ($\Delta_{T2}$). The column in Table 1 labeled $\Delta_{T1}+\Delta_{R2}$ corresponds to beam 114, which is transmitted at first interface 107 ($\Delta_{T1}$) and reflected at second interface 112 ($\Delta_{R2}$). The column in Table 1 labeled $\Delta_{R1}+\Delta_{T2}$ corresponds to beam 120, which is reflected at first interface 107 ($\Delta_{R1}$) and transmitted at second interface 112 ($\Delta_{T2}$). The column in Table 1 labeled $\Delta_{R1}+\Delta_{R2}$ corresponds to beam 116, which is reflected at first interface 107 ($\Delta_{R1}$) and reflected at second interface 112 ($\Delta_{R2}$). The values listed in each Output Channel column are the various relative phase shifts imparted to the beams using the coatings described by the phase shifts in the first four columns of Table 1, all in units of degrees.

The first line in Table 1 corresponds to a first implementation described above, with first beam splitter 107 imparting a phase shift of 0 degrees to the transmitted beam, and a phase shift of 180 degrees to the reflected beam, and beam splitter interface 112 imparting a phase shift of 0 degrees to the transmitted beam, and 90 degrees to the reflected beam. The remaining lines are alternative implementations. As can be seen from an inspection of FIG. 2, the alternative implementations will change which beams will generate signals A, B, C and D. For example, in the second line of Table 1, second beam splitting interface 112 may impart a phase shift of 90 degrees to the transmitted beam, rather than the reflected beam. In this situation, beam 114 will generate signal A, beam 116 will generate signal B, beam 118 will generate signal C, and beam 120 will generate signal D.

Coatings which impart phase shifts are well known, and often comprise materials such as MgFl, Al2O3, TiO2, SiO2 and SiN. Such coatings may be provided by various companies that provide custom optical coating design and fabrication services, for example by Rocky Mountain Instrument Company of Lafayette, Color., USA. In addition, such coatings may be designed using commercially available software packages for designing optical coatings such as "The Essential Macleod" software available from Thin Film Center, Inc., Tuscon, Ariz., and "TFCalc" software available from Software Spectra, Inc., Portland, Oreg., USA. The coatings are typically multilayered, each layer having a different index of refraction, and a thickness chosen to impart the desired phase shift. Typically, these multilayered coatings can be specified to have equal amplitude outputs in transmission and reflection, to approximately +/−3% of amplitude. The phase shift between the S and P polarizations in reflection and transmission can be specified to about +/−10 degrees, or even +/−5 degrees. Therefore, for the two coatings, the uncertainty in output phase shift between the S and P polarizations may be expected to be in the range 10-20%. At a working wavelength of 700 nm, this may correspond to an uncertainty in measured distance or displacement of about 70-140 nm.

However, even if the phase shift imparted at beam splitting interfaces 107 and 112 is not controlled to provide a desired nominal value with perfect certainty, a monolithic quadrature detector may be calibrated to negate the deviation of the various phase shifts from the desired nominal value, using one of a number of techniques. For example, the monolithic quadrature detector 100' may be installed in an interferometer 1 whose object path length 40 and reference path length 50 are known, and the actual phase shifts imparted by the monolithic quadrature detector 100' may be determined and/or calibrated according to known methods. Alternatively, the monolithic quadrature detector 100' may be installed in an interferometer 1 having a light source that can provide at least two known or independently measured wavelengths. By analyzing the outputs of the monolithic quadrature detector 100' obtained at the various known or independently measured wavelengths, the actual phase shifts imparted by the monolithic quadrature detector 100' can be determined and/or calibrated by known methods.

Each of detectors 130, 132, 134 and 136 may be a charge-coupled device (CCD) array, or other multi-pixel array detector. Alternatively, each of detectors 130, 132, 134 and 136 may be a simple, monolithic photodiode that outputs a single signal proportional to the integrated light intensity over the surface of the detector.

Figure 3:
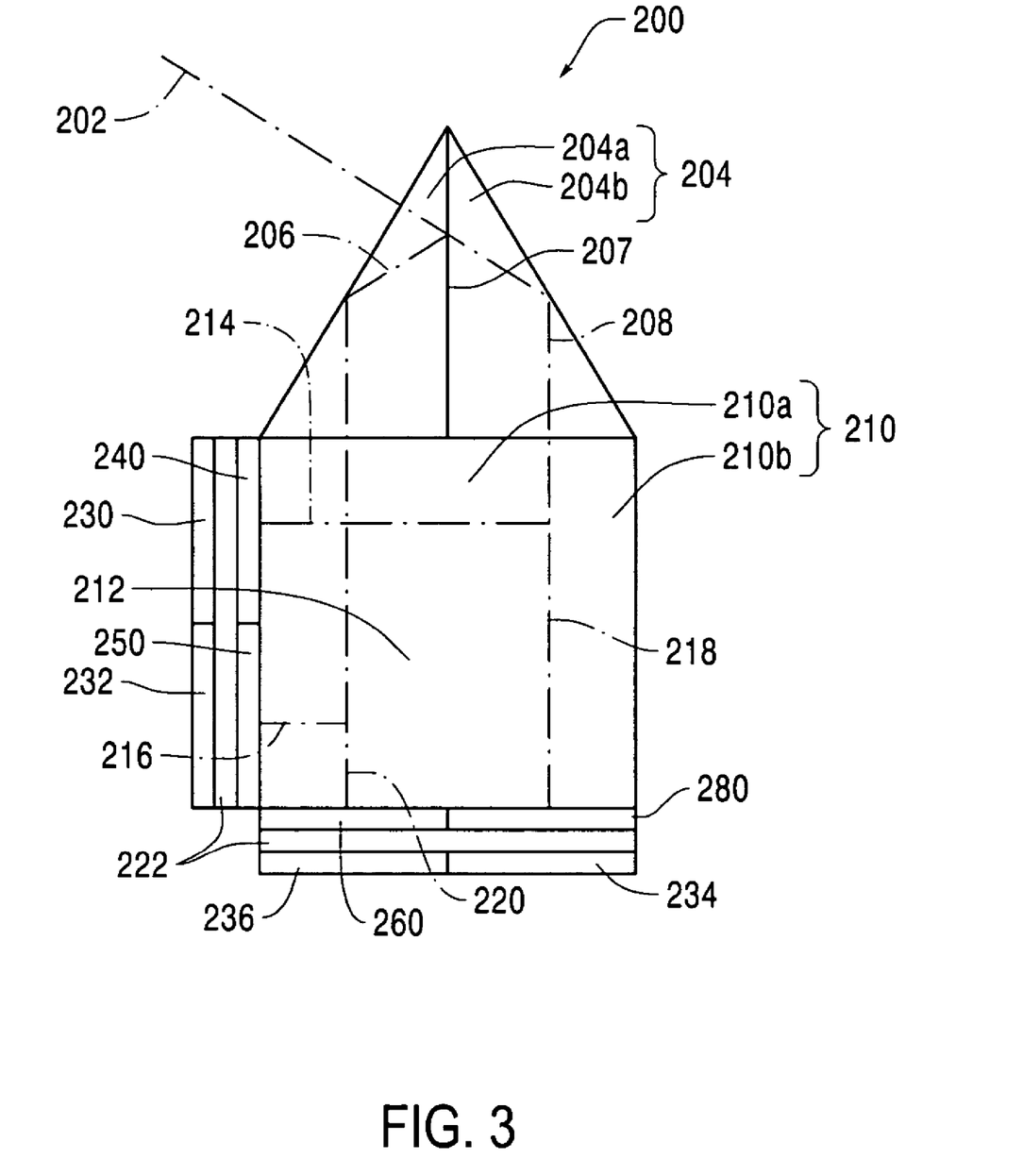
FIG. 3 illustrates another exemplary compact monolithic quadrature detector.

FIG. 3 shows another exemplary compact monolithic quadrature detector 200. Monolithic quadrature detector 200 is similar to exemplary monolithic quadrature detector 100' shown in FIG. 2, except for the inclusion of phase adjusting plates, sometimes referred to as retarder plates. Similar to the detector 100', the monolithic quadrature detector 200 also has two non-polarizing beam splitters 204 and 210, which split an input beam 202 into four output beams 214, 216, 218 and 220 at two beam splitting surfaces 207 and 212.

Beams 214 and 218 may traverse two phase adjusting plates, for example, quarter wave plates 240 and 280. After traversing quarter wave plates 240 and 280, beams 214 and 218 are incident on polarizers 222 and detectors 230 and 234. Quarter wave plates 240 and 280 will impart an additional phase shift between the S and the P polarizations, in addition to the phase shift imparted by beam splitting surfaces 207 and 212. Quarter wave plates 240 and 280 may be used to adjust and or shift the relative phase between the S and P polarizations by a desired amount. Glass spacers 250 and 260 may be added as shown, to compensate the optical path length for other beams 216 and 220. It should be understood that additional implementations may be envisioned, for example, using fewer or more phase adjusting plates having various amounts of phase adjustment, to accomplish similar purposes. The addition of phase adjusting plates may follow the calibration procedure described above with respect to the exemplary detector 100', for example, in order to adjust for a measured offset between the phase shifts imparted by beam splitting surfaces 207 and 212. In one exemplary design, the wave plates 240 and 280 impart selected nominal phase shifts other than ¼ wave between the S and the P polarizations, in addition to a nominal phase shift imparted by beam splitting surfaces 207 and 212, such that nominally the desired net relative phase shifts are provided at the respective detectors of monolithic quadrature detector 200. In another exemplary design, the nominal phase shift imparted by beam splitting surfaces 207 and 212 is designed to be insignificant and the quarter wave plates 240 and 280 impart respective phase shifts between the S and the P polarizations such that the desired net relative phase shifts between the various respective interfering beams detected at the respective detectors are provided entirely by the quarter wave plates 240 and 280. In another exemplary design, the wave plates 240 and 280 are calibrating or compensating wave plates 240 and 280 selected from an available variety of plates, to provide specific phase shifts other than ¼ wave between the S and the P polarizations, such that when the specific phase shifts are added to the phase shifts imparted by the "as built" beam splitting surfaces 207 and 212, desired net relative phase shifts measured to be within a desired tolerance range are provided at the respective detectors of monolithic quadrature detector 200.

Figure 4:
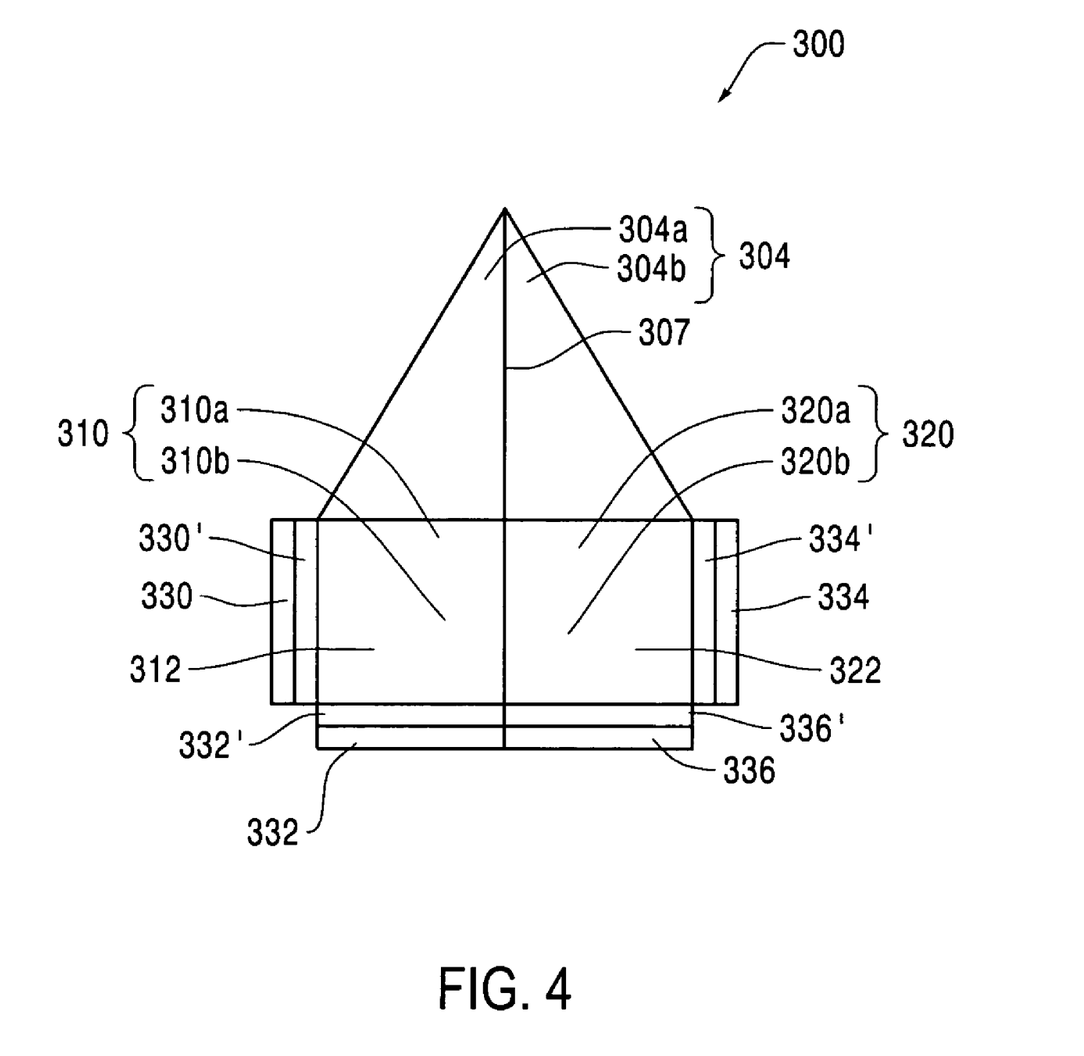
FIG. 4 illustrates another exemplary compact monolithic quadrature detector.

FIG. 4 shows another exemplary monolithic quadrature detector 300. In monolithic quadrature detector 300, a 45-90-45 beam splitting cube is divided into two-subcubes 310 and 320. Each subcube 310 and 320 is made up of a pair of prisms, 310a, 310b, 320a and 320b. Thus, two beam splitting surfaces 312 and 322 are arranged as shown in FIG. 4. Beam splitting surfaces 312 and 322 direct the respective beams through one of the respective polarizers 330', 332', 334' and 336' into one of the respective detectors 330, 332, 334 and 336. It should also be understood that detectors 332 and 336 may be two portions of the same detector or detector array, that are able to provide separate output signals.

Because the beam splitting cube is divided into two subcubes 310 and 320, monolithic quadrature detector 300 may have the advantages of being more compact as well as being easier to assemble. The assembly advantage follows from the fact that monolithic quadrature detector 300 may only require the adhesion of two surfaces at once, for example, the upper surface of prism 310a to the lower surface of prism 304a, followed by the adhesion of surface 320a to the lower surface of prism 304b. In contrast, monolithic quadrature detectors 100' and 200 require the adhesion of both lower surfaces of prisms 104a and 104b to the top of beam splitting cube 110. This may present some assembly difficulties, as prisms 104a and 104b are already constrained by their attachment to each other. In general, precisely adhering two surfaces together which are already constrained to be in a particular orientation is a relatively difficult process, as compared to adhering two surfaces which are free to move relative to each other. Therefore, although monolithic quadrature detector 300 may have a larger number of parts compared to monolithic quadrature detectors 100' and 200, it may nonetheless be advantageous in terms of compactness and ease of assembly.

The monolithic quadrature detector 300 is more compact than monolithic quadrature detector 100', because the volume of subcubes 310 and 320 is only one-quarter of the volume of beam splitting cube 110. Typical dimensions for the subcubes are 10 mm by 10 mm, which provides adequate clearance to comfortably handle a 4 mm diameter input beam. The triangular cross section of the 30-90-60 degree prisms 304a and 304b may have a long side (hypotenuse) 20 mm long and a short side 10 mm long, such that the short sides fit the matching faces of the subcubes 310 and 320, respectively.

Monolithic quadrature detector 300 may have the feature that there are two separate beam splitting interfaces 312 and 322, which may be coated differently, to impart four distinct phase shifts on the beams transmitted and reflected from each interface. This feature may offer greater flexibility in terms of the design of the optical coatings covering beam splitting interfaces 307, 312 and 322. Any combination of beam splitting coatings may be chosen for the three beam splitting interfaces, as long as the total accumulated relative phase shift between the S and the P components of the four beams arriving at detectors 330, 332, 334 and 336 are, in any order, approximately 0, 90, 180 and 270 degrees.

Figure 5:
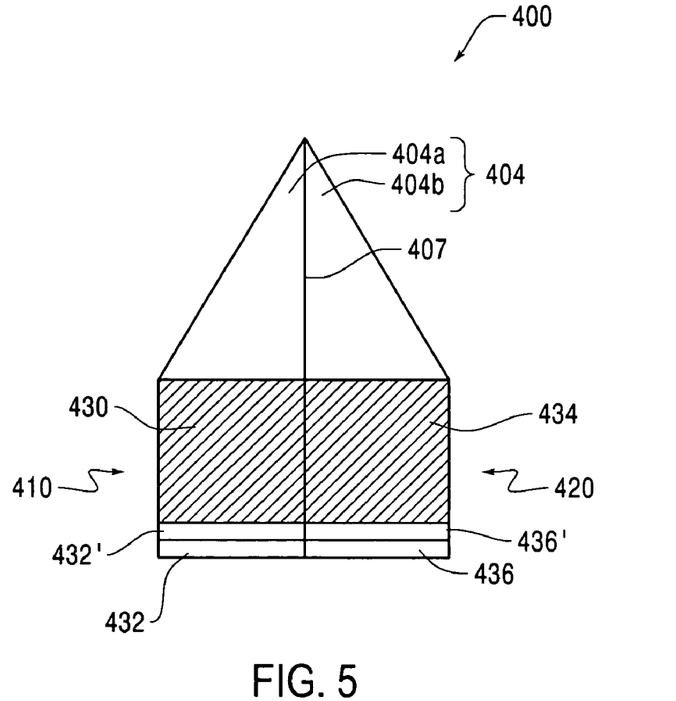
FIG. 5 illustrates a front view of another exemplary compact monolithic quadrature detector.
Figure 6:
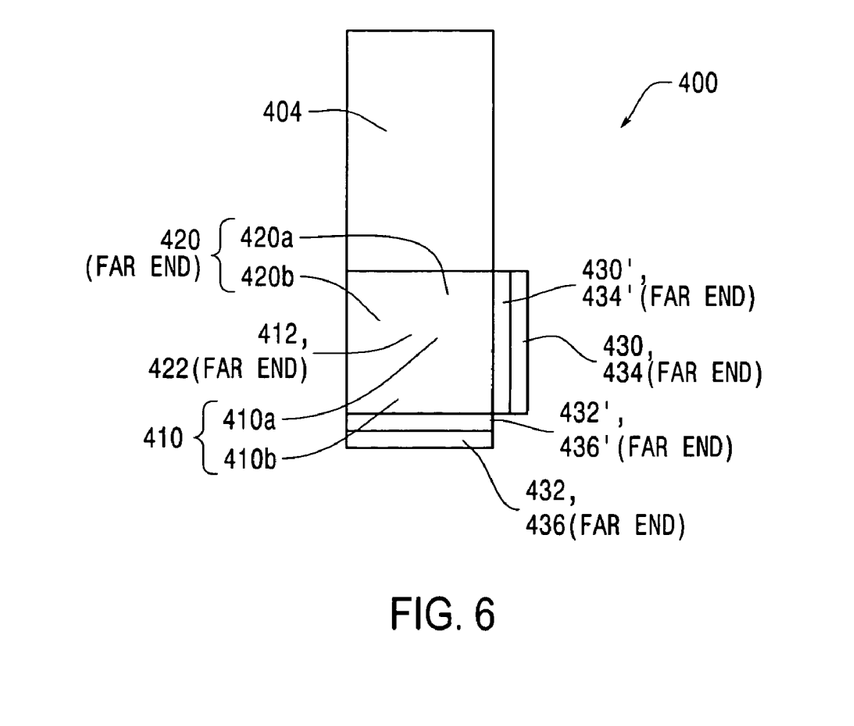
FIG. 6 illustrates a side view of the exemplary compact monolithic quadrature detector shown in FIG. 5.

FIG. 5 shows another exemplary monolithic quadrature detector 400. Monolithic quadrature detector 400 is similar to monolithic quadrature detector 300, in that the 45-90-45 beam splitting cube is divided into two subcubes 410 and 420. In one design, the subcube 410 is made up of a pair of prisms, 410a, 410b and subcube 420 is made up of a similarly arranged pair of prisms, 420a and 420b as best seen in FIG. 6. In monolithic quadrature detector 400, the subcubes 410 and 420 may be respectively rotated clockwise and anti-clockwise by 90 degrees as compared to their counter parts in the monolithic quadrature detector 300 shown in FIG. 4. Therefore, beam splitting surfaces 412 and 422 are not apparent in FIG. 5. The rotation of subcubes 410 and 420, and beam splitting surfaces 412 and 422, means that the detectors 430 and 434 shown in FIG. 5 are located in a plane parallel to the paper.

FIG. 6 is a side view of monolithic quadrature detector 400. Beam splitting surfaces 412 and 422 are apparent in the side view, along with corresponding detectors 430 and 434. By orienting the beam splitting surfaces as shown in FIGS. 5 and 6, a single camera having two portions that are able to provide separate output signals may be used as detector 430 and 434. In particular, detectors 430 and 434 may be two adjacent portions of a single charge-coupled device array. Therefore, monolithic quadrature detector 400 shown in FIGS. 5 and 6 is as compact as monolithic quadrature detector 300 shown in FIG. 4. However, quadrature detector 400 may use only two detectors, whereas quadrature detector 300 uses at least three. Furthermore, the beam splitting surfaces of the subcubes 410 and 420 may be aligned in the same plane. Therefore, in an alternative design, a piece equivalent to merging the pieces 410a and 420a along their common interface and a piece equivalent to merging the pieces 410b and 420b along their common interface may be assembled to provide a relatively longer single beam splitter that is equivalent to merging the two subcubes 410 and 420 along their common interface, thus reducing the number of separate parts that must be assembled in the detector 400.

Figure 7:
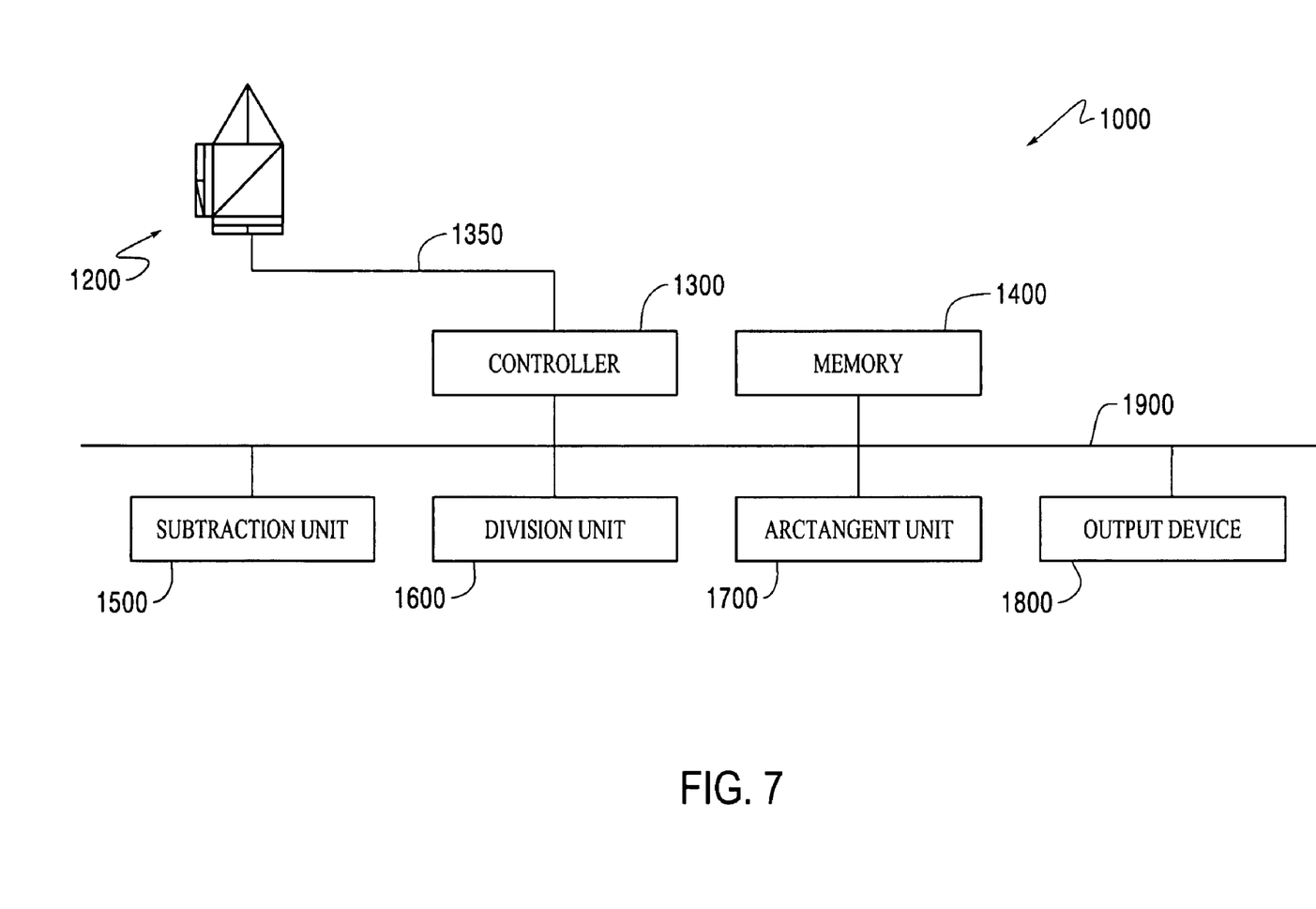
FIG. 7 illustrates an exemplary system using a compact monolithic quadrature detector.

FIG. 7 shows an exemplary system 1000 that may be used to calculate the phase difference between an object beam and a reference beam using a monolithic quadrature detector 1200. System 1000 includes a controller 1300, a memory 1400, a subtraction unit 1500, a division unit 1600, an arctangent unit 1700, and an output device 1800. The aforementioned units 1300-1700 may be coupled on bus 1900, or they may be integrated into an application-specific integrated circuit (ASIC), for example. Units 1500-1700 may be implemented as software stored in memory 1400 and executed on controller 1300, or they may be implemented as hardware circuits, for example, in an application-specific integrated circuit (ASIC). Any hardware or software implementation which performs the function of units 1300-1800 may be used to practice these systems and methods.

Controller 1300 is coupled to receive output signals from the monolithic quadrature detector 1200, for example, through a bus or cable 1350. Monolithic quadrature detector 1200 may be any of monolithic quadrature detectors 100'-400. Controller 1300 gathers signals A, B, C and D described above in relation to FIG. 2, and stores the values in memory 1400. Subtraction unit 1500 then retrieves signal A and signal B from memory, and calculates a first difference between signal A and signal B. Subtraction unit 1500 then stores this first difference in memory 1400. Subtraction unit 1500 then retrieves signals C and D from memory 400, and calculates a second difference between signal C and signal D. The subtraction unit then stores this second difference in memory 1400. Division unit 1600 then retrieves the first difference and second difference stored in memory 1400 by subtraction unit 1500, and calculates the ratio of the first difference to the second difference, and stores this ratio in memory. Arctangent unit 1700 then retrieves this ratio and the signs of the first and second differences from memory 1400, and calculates the phase angle corresponding to the arctangent of the ratio and the signs, and outputs the phase angle to output device 1800. Output device 1800 may be a display, another controller, or another memory, for example. It should be appreciated that an additional calibration or compensation determining and/or applying unit may be included in the system 1000 to determine and compensate or calibrate various errors associated with the signals A, B, C and D that are not addressed by the operations described above, for example, orthogonality errors (that is, errors in the desired relative phase shifts imparted to the various optical interference signals), and/or various amplitude errors, may be addressed by a unit which provides operations equivalent to well-known methods of calibration and/or compensation based on the correction of lissajous patterns derived from similar quadrature signals in interferometers, optical encoders, and the like.

Figure 8:
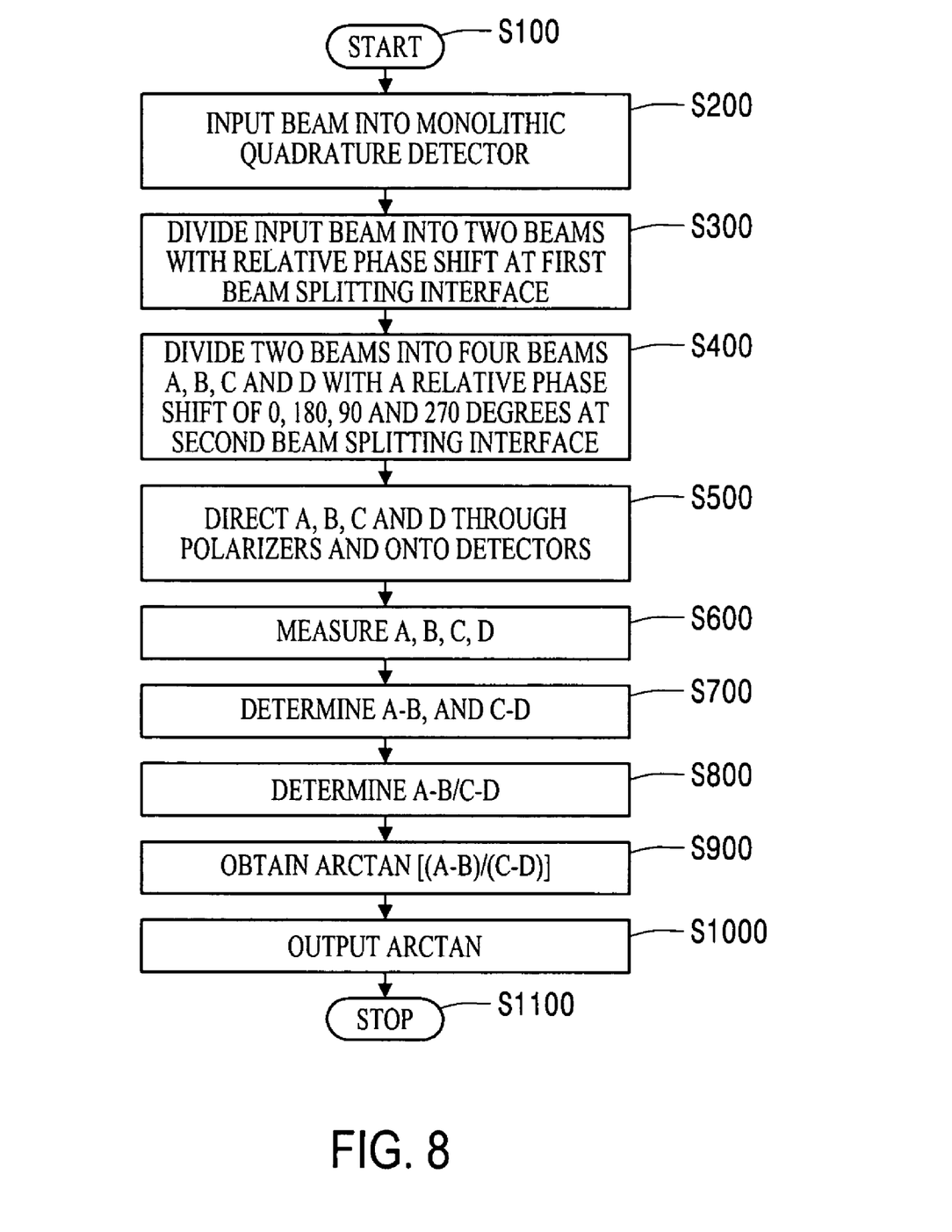
FIG. 8 is an exemplary flowchart of a method for using a monolithic quadrature detector.

FIG. 8 is a flowchart illustrating an exemplary method for obtaining the phase shift between an object beam and a reference beam in an interferometer, using one configuration of a monolithic quadrature detector. The method starts in step S100 and proceeds to step S200, where an input beam having orthogonally polarized object and reference components is input to the monolithic quadrature detector. In step S300, the input beam is divided into two beams, and a relative phase shift is imparted to the phase difference between the orthogonally polarized components of the two beams. For example, the input beam is divided into the two beams at a first beam splitting interface that includes a coating that imparts the relative phase shift.

In step S400, the two beams are divided into four beams A, B, C and D, with four different relative phase shifts 0, 180, 90 and 270, respectively. The beams are divided at a second beam splitting interface that also includes a coating that imparts an additional relative phase shift to the phase difference between the orthogonally polarized components of the beams. In step S500, beams A, B, C and D are directed through polarizers and onto detectors. In step S600, the intensities of beams A, B, C and D are measured. In step S700, a first difference A−B, and a second difference C−D are determined. In step S800, the ratio of A−B to C−D is obtained. In step S900, the arctangent of the ratio of A−B/C−D and the signs of the differences A−B and C−D are analyzed to determine the phase difference between the orthogonally polarized object and reference beams. In step S1000, the phase difference value is output. The process ends in step S1100.

While various details have been described in conjunction with exemplary implementations as outlined above, it is evident that many alternatives, modifications and variations are possible. For example, a monolithic quadrature detector may include other optical elements, such as additional quarter wave plates or half wave plates, lenses and filters, in order to accomplish a specific purpose. Furthermore, a retardation plate included in a monolithic quadrature detector configuration need not be located adjacent to a polarizer element, but may be positioned at any location along a beam path upstream of a polarizer, provided that it is located such that its retardation effect produces a desired relative phase shift between the components of a beam that reaches a polarizer. Furthermore, a plurality of retarder plates may be used instead of a single retarder plate, at various locations along a beam path if desired, in order to provide a desired amount of relative phase shift between the components of a beam. In addition, phase shift values different from 0°, 90°, 180° and 270° may be used in conjunction with complementary signal processing. For example, the principles disclosed herein may be used to adapt various design configurations to provide outputs having relative phase shifts of 0, 120, and 240 degrees, to provide a three phase detector. Accordingly, the exemplary implementations as set forth above are intended to be illustrative, not limiting.

What is claimed is:

1. A monolithic quadrature detector for providing variable signals indicative of a variable phase difference between orthogonally polarized components of an input beam, comprising:

a first non-polarizing beamsplitting element including a first pair of prisms that share a first beamsplitting interface that receives the input beam and divides the input beam into a first transmitted beam having orthogonally polarized components and a first reflected beam having orthogonally polarized components;

a second non-polarizing beam splitting element that includes at least one beamsplitting interface, the at least one beamsplitting interface of the second non-polarizing beam splitting element receiving the first transmitted beam and the first reflected beam and dividing the first transmitted beam into a second transmitted beam and a second reflected beam that each have orthogonally polarized components and dividing the first reflected beam into a third transmitted beam and a third reflected beam that each have orthogonally polarized components;

a first polarizer that receives the second transmitted beam and outputs interfering components to a first detector that outputs a first signal responsive to the variable phase difference;

a second polarizer that receives the second reflected beam and outputs interfering components to a second detector that outputs a second signal responsive of the variable phase difference;

a third polarizer that receives the third transmitted beam and outputs interfering components to a third detector that outputs a third signal responsive of the variable phase difference;

a fourth polarizer that receives the third reflected beam and outputs interfering components to a fourth detector that outputs a fourth signal responsive of the variable phase difference, wherein the first, second, third and fourth signals can be analyzed to determine the variable phase difference between the orthogonally polarized components of the input beam, wherein the first transmitted beam and the first reflected beam each undergo reflection at respective surfaces of the first non-polarizing beamsplitting element that are symmetrically located relative to the first beam splitter interface, before entering the second non-polarizing beam splitting element;

a first phase shifting coating is provided at the first beamsplitting interface, wherein the first phase shifting coating imparts a first relative phase shift ($\Delta_{T1}$) between the orthogonally polarized components of the first transmitted beam and a second relative phase shift ($\Delta_{R1}$) between the orthogonally polarized components of the first reflected beam, wherein the first relative phase shift and the second relative phase shift differ by one of approximately 90 degrees and approximately 180 degrees; and a second phase shifting coating is provided at the at least one beamsplitting interface of the second non-polarizing beam splitting element, wherein the second phase shifting coating imparts a third relative phase shift ($\Delta_{T2}$) between the orthogonally polarized components of the second and third transmitted beams and a fourth relative phase shift ($\Delta_{R2}$) between the orthogonally polarized components of the second and third reflected beams, wherein the third relative phase shift and the fourth relative phase shift differ by the other of approximately 90 degrees and approximately 180 degrees.

2. The detector of claim 1, wherein the second non-polarizing beam splitting element includes at most one beamsplitting interface, the at most one beamsplitting interface of the second non-polarizing beam splitting element receiving the first transmitted beam and the first reflected beam.

3. The detector of claim 2, wherein the first polarizer that receives the second transmitted beam and the second polarizer that receives the second reflected beam are portions of the same polarizer.

4. The detector of claim 3, wherein the third polarizer that receives the third transmitted beam and the fourth polarizer that receives the third reflected beam are portions of the same polarizer.

5. The detector of claim 1, wherein the monolithic quadrature detector is configured such that the second non-polarizing beam splitting element includes two sub-portions that provide two respective beamsplitting interfaces, one of the two respective beamsplitting interfaces receiving the first transmitted beam and the other of the two respective beamsplitting interfaces receiving the first reflected beam.

6. The detector of claim 1, wherein the monolithic quadrature detector is configured such that the first transmitted beam and the first reflected beam are approximately parallel after undergoing reflection at the respective surfaces of the first non-polarizing beamsplitting element and before entering the second non-polarizing beam splitting element.

7. The detector of claim 1, wherein the monolithic quadrature detector is configured such that the second non-polarizing beam splitting element includes at most two prisms, and both prisms of the first pair of prisms abut only a single one of the two prisms of the second non-polarizing beam splitting element.

8. The detector of claim 1, wherein each prism of the first pair of prisms comprises a 30-90-60 degree prism, and the first interface comprises a 50/50 beam splitter.

9. The detector of claim 8, wherein the first pair of prisms is arranged such that a 30 degree angle of one prism is located adjacent to a corresponding 30 degree angle of the other prism, and a 90 degree angle of the one prism is located adjacent to a corresponding 90 degree angle of the other prism.

10. The detector of claim 1, wherein the first and second detectors comprise at least one of charge-coupled device (CCD) arrays, portions of charge-coupled device (CCD) arrays, photodiodes, and portions of split photodiodes.

11. The detector of claim 1, wherein each of first pair of prisms have a short side which is at most 10 mm long.

12. The detector of claim 1, wherein an assembled portion of the detector including at least the first pair of prisms and the second non-polarizing beam splitting element fits within a volume having three respective dimensions that are at most 28 mm, 10 mm, and 20 mm, respectively.

13. The detector of claim 1, further comprising at least one respective phase adjusting plate that provides an adjusting relative phase shift contribution, the at least one respective phase adjusting plate positioned upstream of at least one polarizer and downstream of the first beamsplitting interface, wherein:
at least one beam from a group consisting of the first transmitted beam, the first reflected beam, the second transmitted beam, the second reflected beam, the third transmitted beam and the third reflected beam passes through the at least one respective phase adjusting plate such that a net relative phase shift between the orthogonally polarized components of at least one of the second transmitted beam, the second reflected beam, the third transmitted beam and the third reflected beam is brought closer to one of zero, 90, 180 and 270 degrees by the adjusting relative phase shift contribution.

14. A method for measuring a variable phase difference between orthogonally polarized components of an input beam, comprising:
inputting the input beam into a first non-polarizing beamsplitting element comprising a first pair of prisms that share a first beamsplitting interface, and using the first beamsplitting interface to receive the input beam and divide the input beam into a first transmitted beam having orthogonally polarized components and a first reflected beam having orthogonally polarized components;
outputting the first transmitted beam and the first reflected beam from the first non-polarizing beamsplitting element and into a second non-polarizing beam splitting element that comprises at least one beamsplitting interface, and using the at least one beamsplitting interface of the second non-polarizing beam splitting element to receive the first transmitted beam and the first reflected beam and to divide the first transmitted beam into a second transmitted beam and a second reflected beam that each have orthogonally polarized components, and to divide the first reflected beam into a third transmitted beam and a third reflected beam that each have orthogonally polarized components; and
using a first polarizer to receive the second transmitted beam and to output interfering components to a first detector that outputs a first signal responsive to the variable phase difference;
using a second polarizer to receive the second reflected beam and output interfering components to a second detector that outputs a second signal responsive of the variable phase difference;
using a third polarizer to receive the third transmitted beam and output interfering components to a third detector that outputs a third signal responsive of the variable phase difference;
using a fourth polarizer to receive the third reflected beam and output interfering components to a fourth detector that outputs a fourth signal responsive of the variable phase difference;
determining the variable phase difference between the orthogonally polarized components of the input light beam based on the signals from the first, second, third and fourth signals;
reflecting the first transmitted beam and the first reflected beam at respective surfaces of the first non-polarizing beamsplitting element that are symmetrically located relative to the first beam splitter interface, before they enter the second non-polarizing beam splitting element;
providing a first phase shifting coating at the first beamsplitting interface, wherein the first phase shifting coating imparts a first relative phase shift ($\Delta_{T1}$) between the orthogonally polarized components of the first transmitted beam and a second relative phase shift ($\Delta_{R1}$) between the orthogonally polarized components of the first reflected beam, wherein the first relative phase shift and the second relative phase shift differ by one of approximately 90 degrees and approximately 180 degrees;
providing a second phase shifting coating at the at least one beamsplitting interface of the second non-polarizing beam splitting element, wherein the second phase shifting coating imparts a third relative phase shift ($\Delta_{T2}$) between the orthogonally polarized components of the second and third transmitted beams and a fourth relative phase shift ($\Delta_{R2}$) between the orthogonally polarized components of the second and third reflected beams, wherein the third relative phase shift and the fourth relative phase shift differ by the other of approximately 90 degrees and approximately 180 degrees; and
outputting an arctangent based on the determined variable phase difference.

15. The method of claim 14, wherein reflecting the first transmitted beam and the first reflected beam at respective surfaces of the first non-polarizing beamsplitting element includes reflecting the first transmitted beam and the first reflected beam such that they are approximately parallel after undergoing reflection at the respective surfaces of the first non-polarizing beamsplitting element and before entering the second non-polarizing beam splitting element.

* * * * *